United States Patent
Abramson et al.

(10) Patent No.: US 8,252,216 B2
(45) Date of Patent: Aug. 28, 2012

(54) METHOD FOR THE PRODUCTION OF RAILWAY TIES

(75) Inventors: Brian Abramson, Brampton (CA); James R. Inglis, Brampton (CA)

(73) Assignee: Duropar Technologies, Inc., Brampton, Ontario (CA)

( * ) Notice: Subject to any disclaimer, the term of this patent is extended or adjusted under 35 U.S.C. 154(b) by 57 days.

(21) Appl. No.: 12/713,850

(22) Filed: Feb. 26, 2010

(65) Prior Publication Data

US 2010/0219257 A1   Sep. 2, 2010

Related U.S. Application Data

(60) Provisional application No. 61/202,434, filed on Feb. 27, 2009.

(51) Int. Cl.
*B29C 47/04* (2006.01)
(52) U.S. Cl. ......... 264/173.12; 264/173.16; 264/173.19; 264/174.11; 264/177.22
(58) Field of Classification Search .................. None
See application file for complete search history.

(56) References Cited

U.S. PATENT DOCUMENTS

| | | | | |
|---|---|---|---|---|
| 5,609,295 A | * | 3/1997 | Richards | 238/84 |
| 5,722,589 A | * | 3/1998 | Richards | 238/84 |
| 2003/0203145 A1 | | 10/2003 | Zanchetta et al. | |
| 2004/0175563 A1 | * | 9/2004 | Okerson | 428/331 |
| 2006/0226247 A1 | * | 10/2006 | Abramson et al. | 238/1 |
| 2010/0170956 A1 | * | 7/2010 | Cadwell | 238/85 |

FOREIGN PATENT DOCUMENTS

WO   94/25678   11/1994

OTHER PUBLICATIONS

International Search Report for International Application Serial No. PCT/CA2010/000245 dated May 10, 2010.
Written Opinion for International Application Serial No. PCT/CA2010/000245 dated May 10, 2010.

* cited by examiner

*Primary Examiner* — Edmund H. Lee

(57) ABSTRACT

Durable, weather and an insect-resistant railway ties are fabricated by the co-extrusion into a die of at least one mixture comprising asphalt binder and aggregate and recycled plastic, optionally strengthened by fillers such as glass fiber or KEVLAR.

15 Claims, 1 Drawing Sheet

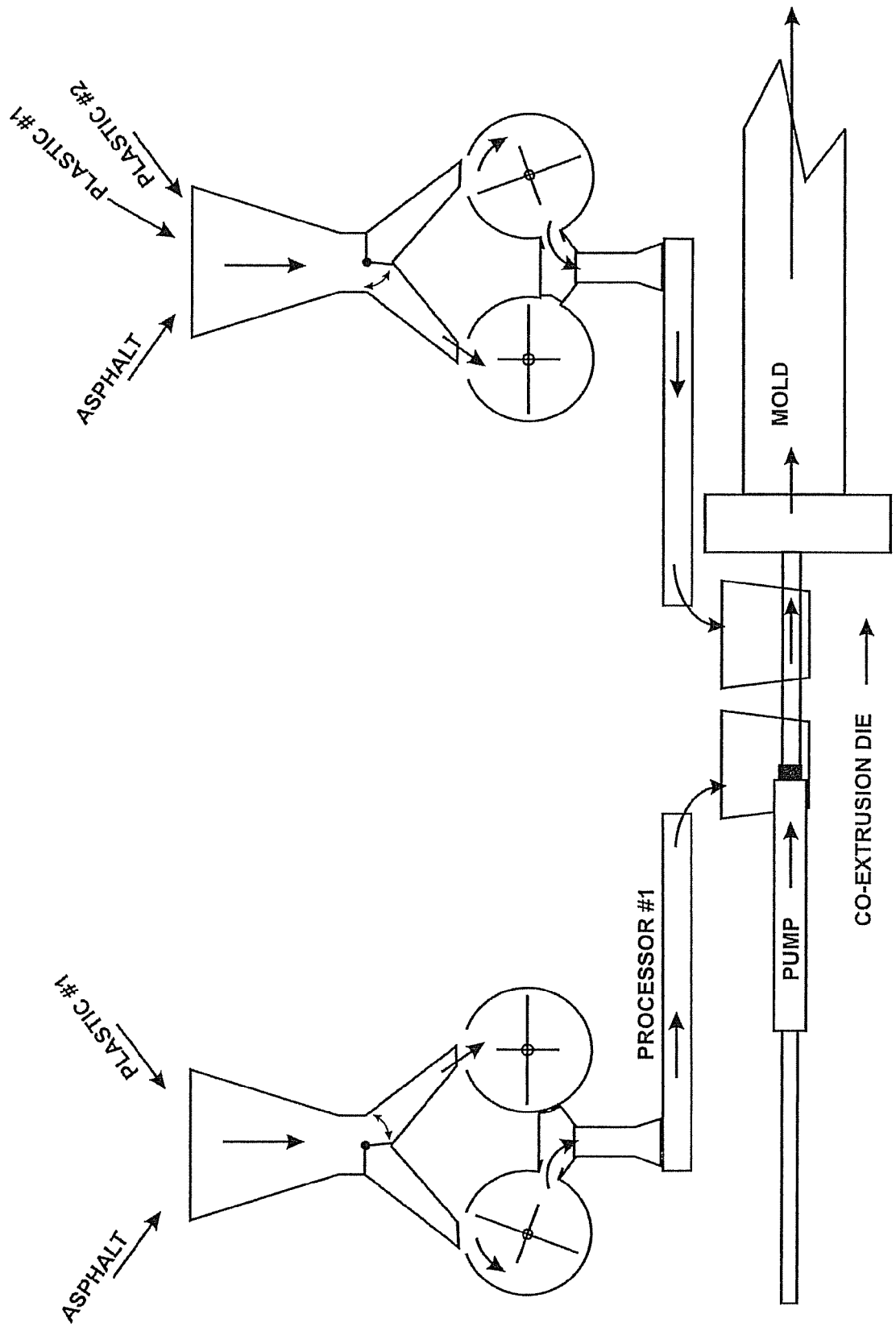

METHOD FOR THE PRODUCTION OF RAILWAY TIES

CROSS REFERENCE TO RELATED APPLICATION

This application claims priority to, and any other benefit of, U.S. Application No. 61/202,434 filed Feb. 27, 2009, which is incorporated by reference herein in its entirety.

FIELD OF THE INVENTION

This invention relates to novel material compositions for railway ties and to methods for the fabrication thereof.

BACKGROUND OF THE INVENTION

To meet the demands of the construction industries, hardwood forests have been depleted steadily, since a large number of structural elements, e.g., railway ties, telephone poles, guard rails, fences and decks have been constructed of such hardwoods. Many industrialized countries have attempted to conserve such forests by developing recycling programs to reduce the need for cutting down trees and to provide a sufficient amount of timber suitable for use in construction. Such recycled timber typically needs to be chemically treated before use for biological resistance and/or strengthening, and thus tends to be rendered toxic.

Railway ties, which are used to support railway tracks on a roadbed of ballast or concrete, are typically made of wood. Wood is the generally preferred constituent material because it can withstand climatic changes, and wooden ties are relatively easy to install and replace. Since thousands of miles of railway tracks are in use throughout the world, a vast number of railway ties is needed each year to replace those which have been worn out over time.

Although wooden railway ties provide durability and withstand well the static and dynamic loads of freight and passenger trains, they are susceptible to attack from fungi and insects which will weaken and eventually deteriorate the railway ties. The lifespan of wooden railway ties can be prolonged by the use of preservatives, in particular creosote, but such preservatives result in potential environmental hazards, both during the treatment procedure for the manufacture of ties, and by reason of leaching of creosote into the surrounding soil and the water table in the region of the railroad. Further, railway ties which have been chemically-treated present a disposal problem in view of environmental concerns over the hazardous chemical preservatives.

Notwithstanding their relative ability to withstand the North American climate, wooden railway ties are susceptible to damage from harsh weather conditions and excessive sunlight. Consequently, they require frequent monitoring and maintenance to prevent failure due to splits (separation along the grain) deterioration of fastening device anchorage, decay and warps. Thus the cost of maintenance of such wooden railway ties can be substantial.

Concrete railway ties are popular in Europe and in Japan, where the availability of hardwood for railway ties is limited. However concrete railway ties, too, have several disadvantages. They are relatively expensive and can crack or spall over a number of years, particularly where used in areas subject to dramatic climactic changes. More significantly, they are susceptible to erosion under the load of rolling stock.

Steel railway ties have also been proposed and put into use, however, they have proved disappointing, since they are susceptible to rust and fatigue factors, and generate an unacceptable high noise level during use. Steel railway ties are more susceptible than wooden ties to shifting within the ballast. Moreover, in those installations in which the steel railway rails are used to send electrical signals along the railroad right-of-way, and must therefore be electrically isolated from one another, the use of electrically-conductive steel railway ties between the rails requires expensive additional insulation.

DESCRIPTION OF THE PRIOR ART

Others have attempted to manufacture railway ties from various synthetic plastics and synthetic plastic polymer composites as an alternative to wood. Such manufactured plastic composite railway ties exhibit the necessary stiffness strength, as well as increased resistance to degradation from moisture, excessive sunlight and attacks by microorganisms and insects. However, the cost of virgin plastics can be prohibitively great for economically feasible production of railway ties. Many such plastic railway ties can potentially release toxic materials during their disposal, or in the event of a track fire.

Attempts have therefore been made to manufacture railway ties from recyclable waste, often with the addition of strengthening agents. However, much of the recycled waste contains not only the desired components—high-density polyethylene, or low density polyethylene, but also contains a mixture of other materials, e.g., polyvinylchloride or low density polyethylene. Separation of the required high density polyethylene from the other plastic materials is difficult and adds significantly to the cost of manufacturing of railway ties from such recyclable waste materials. In addition, such railway ties often require expensive and specialized fastening systems.

Among the many patents directed to molded composite block-like products which have been considered or actually tested for use on this application are the following:

U.S. Pat. No. 4,405,727 patented Sep. 20, 1983 by T. F. Brownscombe, is directed to reinforced polymer compositions. Such polymer reinforcing material consisted of a particulate mineral material, e.g., silicates, aluminosilicates, glasses, mica, talc, clays, bentonites, kaolins, vermiculite, asbestos, calcium silicates, wollastonite silica and alumina, having, as reactive surface sites, oxygen atoms or hydroxyl atoms, or a filamentary mineral material, e.g., standard glass fibers, chopped or continuous or milled or natural fibrous materials, e.g., asbestos, having a very thin film of organic molecules, e.g., polypropylenes, polyethylenes, S-B-S thermoplastic elastomers, poly-1-butene, poly(vinyl arene) homopolymers and copolymers polystyrene, ABS SAN, polyesters, polybutylene terephthalate, polyethylene terephthalate poly(phenoxy) poly(aryl ether) nylons and polyurethanes which are chemically bonded to its surface.

U.S. Pat. No. 5,221,702, patented Jun. 22, 1993 by Richards describes a paving block formed from asphalt, a synthetic plastic material, e.g., polyethylene, a phenolic resin or polyvinyl chloride, an elastomeric material, e.g., rubber and a fibre material, e.g., nylon or rayon. The materials are heated and blended together into a uniform composite mixture. The composite mixture is then molded into individual paving blocks. There is no explicit or implicit teaching of a composition comprising asphalt and a mixture of glass fibre-filled polypropylene and high density and/or low density polyethylene.

U.S. Pat. No. 5,367,007, patented Nov. 22, 1994 by Richards, discloses a multi-layer molded composite paving block. The first layer of the multi-layer molded composite paving block was formed from recycled asphalt, a thermosetting or thermosetting synthetic plastic, a monofilament fibre material and an elastic material. The second layer of the multi-layer molded composite paving block was formed from a synthetic thermoplastic material, e.g., polyethylene or a thermosetting synthetic plastic and an aggregate material. During the manufacturing procedure, the synthetic plastic material of each of the layers was heated and was sure bonded to one another. This forms an interlocked structural interface to provide a single integral block.

U.S. Pat. No. 5,609,295, patented Mar. 11, 1997 by Richards, describes a composite railway tie which included a main body portion made of a binding constituent and an aggregate material. The binding constituent was a synthetic plastic material and the aggregate material was in the form of irregular multi-faceted pieces, e.g., gravel limestone or granite. The binding constituent held the aggregate material together. The railway tie may also include an inner strengthening core of high tensile strength material. There is no explicit or implicit teaching of a composition comprising asphalt and a mixture of glass fibre-filled polypropylene and high density and/or low density polyethylene.

U.S. Pat. No. 5,722,589, patented Mar. 3, 1998 by Richards, provides a composite load bearing structure including a main body portion made of a binding constituent and an aggregate material. The structure included an inner strengthening member of high tensile strength material within the body. Such an inner strengthening member comprised reinforcing bars, rolled drawn or cast ferrous sections, rolled drawn or cast composite alloy sections, plastic metallic or carbon based fibres, wire mesh or expanded metal mesh.

U.S. Pat. No. 5,789,477, patented Aug. 4, 1998 by Nosker, provides a composite building material formed from recyclable waste. The composite material comprised a mixture of high-density polyethylene and a thermoplastic-coated fibre, e.g., glass fibres.

U.S. Pat. No. 6,191,228, patented Feb. 20, 2001 by Nosker, provides a railway tie formed from a synthetic plastic composite material. Such plastic composite material included a polystyrene component forming a first phase and a polyolefin component forming a second phase. Such two phases intertwine and remain continuous throughout the composite railway tie.

U.S. Pat. No. 6,247,651, patented Jun. 19, 2001 by Marinelli, provides a railway tie shaped like an I-beam made from a combination of recycled materials. Such combination of recycled materials was composed of recycled high-density polyethylene and polypropylene, scrapped and granulated rubber tires and screened waste glass fibres.

U.S. Pat. No. 7,122,594 patented Oct. 17, 2006 by N. Kubo et al is directed to modified block copolymer compositions. Such compositions consisted of a mixture of a particular block copolymer, e.g., of vinyl aromatic hydrocarbons and conjugated dienes and a suitable filler, e.g., silica-based inorganic fillers, metal oxides and metal hydroxides.

International Application WO 2005/014708, published 17 Feb. 2005 in the name of J. M. Tour et al describes elastomers reinforced with carbon nanotubes. The composition comprises an elastomeric precursor e.g., poly (dimethylsiloxane) polyisoprene, polybutadiene, polyisobutylene, etc. There is no explicit or implicit teaching of a composition comprising asphalt and a mixture of glass fibre-filled polypropylene and high density and/or low density polyethylene.

OBJECTS AND SUMMARY OF THE INVENTION

It is a principal objective of the present invention to provide a composite article, in particular a railway tie, which is not subject to the disadvantages described above in relation to wooden, concrete and steel railway ties, and railway ties manufactured from the synthetic plastic and synthetic plastic polymer composites described in the previous section.

It is, accordingly an objective of the invention to formulate compositions and methods of manufacture for providing railway ties which are not susceptible to damage from harsh weather conditions and excessive sunlight; not susceptible to attack from fungi and insects which weaken and eventually deteriorate the railway ties; which are free of preservatives, e.g., creosote, which can result in environmental hazards; and which are composed of substantially recycled materials having a lower polymer/plastic content than many current alternative railway ties.

With a view to achieving these objectives and overcoming the aforementioned disadvantages of the prior art, the invention provides in a first aspect an extrudable composition suitable for the forming of railway ties and other articles requiring the ability to support the high loads and impacts encountered in use. Composites according to this aspect comprise (A) from about 20% to about 85% by weight of an asphaltic portion, and (B) correspondingly, from about 80% to about 15% by weight of a polymeric portion comprising a mixture of (i) a recyclable plastic and (ii) a strengthening mixture made up of virgin or recycled polypropylene or a functionally equivalent synthetic polymer reinforced by the inclusion of glass fibres, fibres which are functionally equivalent to glass fibres; or functionally similar reinforcing agents.

According to a further aspect of the invention, there is provided a railway tie which is formed from a composition according to the invention as aforesaid by molding.

According to a still further aspect of the invention, there is provided a railway tie having a first portion formed of a first selected composition according to the invention and a second portion formed from a second selected composition according to the invention.

The present invention in a still further aspect is directed to a method for producing a railway tie having a first portion and a second portion of differing composition, by charging the first channel of a dual material die with a first composition according to the invention and the second channel of the dual material die with the second composition according to the invention, then pumping the two mixtures through the dual material die into a flow mold to shape and cool the composite into a railway tie.

DESCRIPTION OF PREFERRED EMBODIMENTS

The single drawing FIGURE illustrates the process according to the invention for preparing a composite article, such as a railway tie, having a first region made of a first synthetic asphalt/plastic material of the present invention ("Formula I") and a second region made of a second formulation of this kind ("Formula II").

In the drawing and in the description which follows, "Formula I" refers to the composition which makes up a portion of the railway tie which is of special strength and durability and is disposed within the strategically-located area of the railway tie where fasteners are to be located. This could, for example, be a central core section of the formed railway tie. The balance of the railway tie is composed of a "standard mix" identified as Formula II, a less costly material than Formula II, but having properties which are more than adequate for its intended use. In a different arrangement, the extruded products of Formulas I and II could be in horizontally layered cross-sections of the composite article.

As noted above, in its broadest aspect extrudable asphalt/plastic compositions according to the present invention comprise (A) an asphaltic portion and (B) a polymeric composition which itself is made up of a mixture of (i) a recyclable plastic and (ii) a strengthening mixture.

As used herein, "plastics" refers to various organic compounds produced by polymerization, capable of being molded, extruded, cast into various shapes, including polymer or recycled thermoplastic material.

We have found that the recyclable plastic component may be selected from a wide range of readily available, potentially waste products. As examples:
1—PET (Like drinking bottles, peanut butter jars)
2—HDPE (Like Bleach Bottles)
3—PVC
4—LDPE (Often Film Such as Milk Bags)
5—PP
6—PS (Like Clamshell Containers and Foam "Peanuts")
7—Other (Rigid Containers Such as Margarine Tubs, Blister Packs etc.)

Breaking strengths in a three-point flexure test (on a 6" span of fabricated railway tie) exhibited breaking strengths generally in a range from 1600-2000 p.s.i. or greater. A wide variety of possible polymeric materials and strengtheners were found to produce good results when the weight ratio of asphaltic portion/recyclable plastic/strengthening mixture was 75%/12.5%/12.5% (asphalt/polymer/strengtheners). The preferred embodiments described below relate to DUROPAR™ standard material mix which we used for benchmark measurements.

Formula I, the "strengthened mix" in DUROPAR™ formulations contains from 15% to 75% asphaltic material and from 85% to 25% of a first polymeric composition, which itself is comprised of (i) about 50% recyclable thermoplastic material (hereinafter "Formula I, Part 2(i)") and (ii) about 50% of a glass fibre-filled recyclable thermoplastic material, such as a glass fibre-filled polypropylene, as strengthening agent, or with an alternative filler of equivalent strengthening effect (hereinafter "Formula I, Part 2(ii)"). Exemplary Formula I embodiments include, without limitation, compositions with ranges of (a) 65-75%/35-25% (asphaltic material/first polymeric composition) and (b) 70-75%/12-15%/12-15% (asphaltic material/Formula I, Part 2(i)/Formula I, Part 2(ii)).

Formula II in DUROPAR™ formulations comprises from about 20% to about 85% by weight of an asphaltic portion and from about 15% to about 80% by weight of a second polymeric portion comprising (i) recyclable thermoplastic material (hereinafter "Formula II, Part 2(i)") and (ii) optionally a glass fibre-filled recyclable thermoplastic material as a strengthening agent, or with an alternative filler of equivalent strengthening effect (hereinafter "Formula II, Part 2(ii)"). Exemplary Formula II embodiments include, without limitation, compositions with ranges of (a) 70-80%/30-20% (asphaltic material/second polymeric composition) and (b) 73-77%/12-15%/12-15% (asphaltic material/Formula II, Part 2(i)/Formula II, Part 2(ii)). In one embodiment, about 50% of the strengthening agent is used. In certain embodiments, less than, but up to 50% of the strengthening agent may be used, depending on the desired strength of the overall formulation. Of course, more than 50% of the strengthening agent may also be used.

In the formulations used in the present invention, the asphaltic portion may be a conventional mixture of asphalt binder and aggregate. It is preferred, however, that the asphaltic portion which is mixed with the plastic portion in preparing a charge of Formula I or Formula II be made up of asphalt particles of a size such that at least 75% of such particles would pass through a screen having 0.50" square openings. A suitable material for this purpose are ⅜" and/or ¼" fines of asphalt readily available from asphalt manufacturers.

Where "recyclable thermoplastic material" is used in the description and claims herein, it will be understood to include the materials listed above as potential waste products. However, virgin or recycled polypropylene or polyethylene (high-density and/or low-density), or other thermoplastic material, may be substituted if recycled materials are not available. In Formula II, the afore-mentioned strengthening agent is preferably glass fibre-filled high-density polypropylene.

Composite blocks in the shape of railway ties formulated from asphaltic/plastic compositions according to the present invention may be manufactured in a number of ways. For example, the composition may be heated to workable condition (250-400° F.) and molded under a suitable pressure, either in cavity molds to provide a plurality of individual railway ties, or in a continuous mold, followed by subdivision of the molded product into a plurality of individual railway ties.

However, we have found that railway ties having excellent properties can be made in a continuous process on a production line illustrated in the schematic drawing of the FIGURE. Each production line requires two heated auger processors (one for Formula I and one for Formula II) and each auger processor is fed by a batching hopper feeding into two blenders. The plastic (and in the case of Formula II reinforced plastic) component and the granular asphalt component are charged into a batching hopper in the desired relative amounts, whence they are fed into rotating blenders to produce the plastic/asphaltic mixture which is fed into the processor.

The raw materials for the plant process of the present invention comprise two kinds of thermoplastic—typically polyethylene and polypropylene—in the form of pellets, flakes, etc. and crushed asphalt pavement. Plastic pellets are typically delivered in gaylords or in bulk, via truck or rail transport. Gaylords of plastic pellets are normally unloaded into onsite or shipping containers by the application of vacuum, or by tipping and gravity feeding into a receiving hopper or bin.

The crushed asphalt used in the formulation is typically delivered in 25 to 60 ton dump truck loads. The three raw materials are delivered to the plant pre-processed ready to mix together in accordance with the formulas described above.

A preliminary blender, which may incorporate preheating means to dry the mixture, mixes Formula I or Formula II components to a homogeneous dry consistency and, on demand, continuously feeds that mix to the dedicated DUROPAR™ heated auger processor at a rate dictated by the speed of operation of the processor.

As noted above, each production line includes two such processors and each processor requires two blenders to maintain a steady flow of mixed materials to the respective auger processors.

The DUROPAR™ processor used in the method of the invention is, in effect, a heated auger mechanism having a rotating screw inside a barrel of a length from 6 to 15 feet. The role of the heated auger in combining plastic and asphalt to produce Formula I or Formula II is three-fold:
  (i) heating the mixture of plastic (or reinforced plastic) and asphalt until the plastic and asphalt phases have both reached the melting stage;
  (ii) mixing the melted materials further to allow them to become a true composite; and (iii) transporting the composite material through the barrel of the auger processor to discharge the composite into a retrieving tray, hopper or conveyor, for introduction into a flow mold apparatus.

The metal barrel encasing the auger is heated to a suitable temperature, depending upon the mix being processed, but typically between about 320° F. and 550° F. The objective is to heat the plastic/asphalt mix itself to the melting temperature of the plastics. The melting range of thermoplastic materials useful in this invention will be roughly in the range of from 300° C. to 340° C.

A gradient of temperatures zones is maintained in the processor, so that there is a higher temperature where processing and discharge of the formula is under way, to speed up heat transfer to the material, with a lower temperature maintained while the processor is idle. It is important to note that the Formula I blenders feed the Formula I auger processor while the other blender is being refilled or the mixture is being blended in the batching hopper blenders, and conversely. That is to say, one blender is filling or mixing while the other is feeding.

The semi-fluid composite exiting from the processor is fed into a pump which injects the formula at about 2000 psi. through a conventional "dual material" die into a flow mold (tie mold). The flow mold both shapes and cools the composite until it stabilizes enough to emerge from the mold. The process is analogous to extrusion molding in plastics technology.

Optionally, once the composite emerges from the mold as a tie, the tie can be textured, to better grip the ballast the tie will be laid on and decrease movement of the tie once installed. The texturing is typically administered to three sides of the tie, so that the top side, to which the rail is attached, remains smooth. Texturing can be in any suitable pattern, for example, a diamond pattern, and can use any texturing means. For example, texturing of the tie can be through the embossing of a pattern onto the tie using one or more embossing wheels, which are subject to heat and which rotate as the tie is passed through them. Texturing can also be through a stamping process.

While the present invention has been illustrated by the description of embodiments thereof, and while the embodiments have been described in some detail, it is not the intention of the applicant to restrict or in any way limit the scope of the appended claims to such detail. Additional advantages and modifications will readily appear to those skilled in the art. Additionally, the steps of methods herein may generally be performed in any order, unless the context dictates that specific steps be performed in a specific order. Therefore, the invention in its broader aspects is not limited to the specific details, representative apparatus and methods, and illustrative examples shown and described. Accordingly, departures may be made from such details without departing from the spirit or scope of the applicant's general inventive concept.

The invention claimed is:

1. A method for manufacturing a railway tie having a first portion fabricated of a first composition and a second portion fabricated of a second, different composition, said first composition comprising 15% to 75% by weight of a first asphaltic component and from 85% to 25% of a first polymeric composition and said second composition comprising from 20% to 85% by weight of a second asphaltic component and from 80% to 15% by weight of a second polymeric component, each of said first and second polymeric component comprising a mixture of a recyclable plastic and a strengthening agent, comprising the steps of:

(i) separately preparing and blending selected amounts of asphalt and plastic to produce a first blend having said first composition and a second blend having said second composition;

(ii) separately melting and processing said first blend and said second blend in processors operable to heat and feed said blends separately as composite asphalt plastic composition to pump means associated with a co-extrusion die; and (a) pumping the heated and semi-fluid first composition into a first section of a mold to form said core portion of the railway tie, and simultaneously injecting the heated and semi-fluid second composition into an outer portion of the mold to form the outer portion of said railway tie, or (b) pumping the heated and semi-fluid second composition into a first section of a mold to form said core portion of the railway tie, and simultaneously injecting the heated and semi-fluid first composition into an outer portion of the mold to form the outer portion of said railway tie.

2. A method according to claim 1, wherein the recyclable plastic is a recyclable thermoplastic material.

3. A method according to claim 1, wherein said strengthening agent comprises a recyclable thermoplastic material reinforced by the inclusion of fibres, or reinforcing agents.

4. A method according to claim 1, wherein said strengthening agent comprises virgin or recycled polypropylene or a synthetic polymer, reinforced by the inclusion of fibres, or reinforcing agents.

5. A method according to claim 1, wherein said first asphaltic component, second asphaltic component, or both first and second asphaltic components comprise a mixture of asphaltic binder and aggregate.

6. A method according to claim 1, wherein said first asphaltic component, second asphaltic component, or both first and second asphaltic components comprise asphaltic particles such that at least 75% of the particles can pass through a 0.50" mesh screen.

7. A method according to claim 1, wherein said first polymeric component, second polymeric component, or both first and second polymeric components comprise about 50% by weight of strengthening agent.

8. A method according to claim 1, wherein said first polymeric component, second polymeric component, or both first and second polymeric components comprise approximately equal amounts by weight of said recyclable plastic and said strengthening agent.

9. A method according to claim 1, wherein said strengthening agent comprises virgin or recycled polypropylene filled with glass reinforcing fibres.

10. A method according to claim 2,
wherein said strengthening agent comprises virgin or recycled polypropylene or a synthetic polymer, reinforced by the inclusion of fibres, or reinforcing agents,
wherein said first asphaltic component, second asphaltic component, or both first and second asphaltic components comprise a mixture of asphalt binder and aggregate,
wherein said first asphaltic component, second asphaltic component, or both first and second asphaltic components comprise asphalt particles such that at least 75% of the particles can pass through a 0.50" mesh screen, and
wherein said first polymeric component, second polymeric component, or both first and second polymeric components comprise about 50% by weight of said strengthening agent.

11. A method according to claim 2,
wherein said strengthening agent comprises virgin or recycled polypropylene or a synthetic polymer, reinforced by the inclusion of fibres, or reinforcing agents,
wherein said first asphaltic component, second asphaltic component, or both first and second asphaltic components comprise a mixture of asphalt binder and aggregate,
wherein said first asphaltic component, second asphaltic component, or both first and second asphaltic components comprise asphalt particles such that at least 75% of the particles can pass through a 0.50" mesh screen, and
wherein said first polymeric component, second polymeric component, or both first and second polymeric components comprise approximately equal amounts by weight of said recyclable plastic and said strengthening agent.

12. A method according to claim 3, wherein the fibres are glass fibres.

13. A method according to claim 4, wherein the fibres are glass fibres.

14. A method according to claim 10, wherein the fibres are glass fibres.

15. A method according to claim 11, wherein the fibres are glass fibres.

* * * * *